(12) United States Patent
Janardhana et al.

(10) Patent No.: US 10,046,395 B2
(45) Date of Patent: Aug. 14, 2018

(54) LAMINATED FILM FOR PACKAGING

(71) Applicant: Conopco, Inc., Englewood Cliffs, NJ (US)

(72) Inventors: Sridhar Janardhana, Mumbai (IN); Adesh Tewari, Lucknow (IN)

(73) Assignee: Conopco, Inc., Englewood Cliffs, NJ (US)

( * ) Notice: Subject to any disclaimer, the term of this patent is extended or adjusted under 35 U.S.C. 154(b) by 478 days.

(21) Appl. No.: 14/429,090

(22) PCT Filed: Sep. 26, 2013

(86) PCT No.: PCT/EP2013/070031
§ 371 (c)(1),
(2) Date: Mar. 18, 2015

(87) PCT Pub. No.: WO2014/053383
PCT Pub. Date: Apr. 10, 2014

(65) Prior Publication Data
US 2015/0232246 A1    Aug. 20, 2015

(30) Foreign Application Priority Data

Oct. 5, 2012    (IN) .......................... 2931/MUM/2012
Nov. 21, 2012   (EP) ..................................... 12193518

(51) Int. Cl.
B32B 27/36    (2006.01)
B23B 27/08    (2006.01)

(52) U.S. Cl.
CPC ..................................... B23B 27/08 (2013.01)

(58) Field of Classification Search
CPC ............ B32B 2250/03; B32B 2250/24; B32B 2323/04; B32B 2367/00
USPC ........................................................ 428/458
See application file for complete search history.

(56) References Cited

U.S. PATENT DOCUMENTS

| | | | | |
|---|---|---|---|---|
| 3,925,591 A * | 12/1975 | Breitenfellner | ......... | B32B 27/00 156/244.14 |
| 4,274,900 A * | 6/1981 | Mueller | ................ | B29C 55/023 156/229 |
| 4,705,707 A * | 11/1987 | Winter | .................... | B32B 27/08 264/176.1 |
| 4,874,621 A * | 10/1989 | Loughrin | ................ | B65B 3/045 229/117.35 |
| 6,336,553 B1 * | 1/2002 | Gordon | ................. | B65D 65/16 206/77.1 |
| 6,338,890 B1 * | 1/2002 | Kobayashi | .............. | B32B 27/36 428/141 |
| 6,361,856 B1 * | 3/2002 | Wakai | ..................... | B32B 27/32 428/220 |
| 7,037,576 B2 * | 5/2006 | Willham | ................. | B32B 27/08 156/297 |
| 7,279,450 B2 * | 10/2007 | Macedo | ............. | C11D 17/0047 510/140 |
| 2004/0238608 A1 * | 12/2004 | Van Gordon | .......... | B65D 65/18 229/87.01 |
| 2008/0029584 A1 * | 2/2008 | Van Gordon | ............. | B32B 3/02 229/87.01 |
| 2009/0049802 A1 | 2/2009 | Johnson | | |
| 2011/0248036 A1 * | 10/2011 | Peplinski | ................. | B32B 7/02 220/573.1 |
| 2015/0232246 A1 * | 8/2015 | Janardhana | ............ | B65D 65/40 206/484.2 |
| 2016/0318681 A1 * | 11/2016 | Janardhana | ............ | B65D 65/14 |

FOREIGN PATENT DOCUMENTS

| | | |
|---|---|---|
| BR | PI0500071 | 9/2005 |
| CN | 1295516 | 5/2001 |
| CN | 1640781 | 7/2005 |
| EP | 0812874 | 12/1997 |
| EP | 0931646 | 7/1999 |
| EP | 1176002 | 1/2002 |
| EP | 1183193 | 9/2003 |
| EP | 1897910 | 3/2008 |
| FR | 2873705 | 2/2006 |
| FR | 2815755 | 4/2012 |
| JP | 3108533 | 5/1991 |
| JP | 4307239 | 10/1992 |
| JP | H08011928 | 1/1996 |
| JP | H10278918 | 10/1998 |
| JP | 2005179555 | 7/2005 |

(Continued)

OTHER PUBLICATIONS

Package System for detergent bars, dated Mar. 26, 2013, XP00271583. In J2172USw-NPLRef1, p. 1 to 1.
Search Report in EP12193518, dated Jan. 25, 2013; in J2172USw-NPLRef1, pp. 2 to 3.
Search Report in PCTEP2013070031 dated Nov. 25, 2013, in J2172USw-NPLRef1, pp. 4 to 7.
Written Opinion in EP12193518 dated Jan. 25, 2013, in J2172USw-NPLRef1, pp. 8 to 9.
Written Opinion in PCTEP2013070031 dated Nov. 25, 2013, in J2172USw-NPLRef1, pp. 10 to 15.

*Primary Examiner* — Michael A Salvitti
(74) *Attorney, Agent, or Firm* — Greenberg Traurig, LLP

(57) ABSTRACT

Disclosed is a sustainable plastic laminated film particularly for packaging soap bars by envelope wrapping method. Disclosed is a laminated film for packaging comprising: (i) a first layer of polyester; (ii) a second layer of polyester; and, (iii) an intermediate layer comprising polyethylene therebetween wherein thickness of the intermediate layer having polyethylene is less than thickness of either of the adjacent layers of polyester. It has been determined that at least some technical problems pertaining to adaptability on packaging machines can be overcome by introducing the intermediate layer having polyethylene between the two layers of polyester.

13 Claims, No Drawings

(56) References Cited

FOREIGN PATENT DOCUMENTS

| | | | |
|---|---|---|---|
| WO | WO9724395 | | 7/1997 |
| WO | WO9938685 | | 8/1999 |
| WO | WO0075035 | | 12/2000 |
| WO | WO 03/004268 | * | 1/2003 |
| WO | WO03004268 | | 1/2003 |
| WO | WO03020607 | | 3/2003 |
| WO | WO07134911 | | 11/2007 |
| WO | WO 2007134911 A1 | * | 11/2007 |
| WO | WO 2012/00739 A1 | * | 1/2012 |
| ZA | 200500240 | | 10/2006 |

* cited by examiner

LAMINATED FILM FOR PACKAGING

The invention relates sustainable plastic laminated films particularly for packaging soap bars by envelope wrapping method.

Soap and detergent bars are available in various shapes ranging from oval to square to the conventional rectangular ones. Soap bars are usually wrapped in envelope format. Flow-wrapped bars can also found but to a lesser extent. Usually a thin plastic film is used for envelope wrapping. The plastic film, which is generally made of polyester, is usually laminated to a paper film (e.g. poster paper) using an adhesive such as hot melt adhesive. Paper is included for added strength and better adaptability on packaging machines. It also reduces loss of volatile ingredients such as perfume and moisture. Usually the paper component is coated with a thin coat of polyethylene glycol to further improve the adaptability of the plastic-paper laminate. For added strength, envelope wrapped soap bar packages generally also contain a stiffener, which is also usually made of paper.

Industries are gradually moving to sustainable packaging formats with focus on recyclable and environment-friendly packs. Paper-free packaging is considered to be sustainable. However, limited information is available about paper-free plastic films which are suitable for envelope wrapping of soap or detergent bars.

US 2009049802 A1 (Colgate-Palmolive) discloses use of a BOPP-BOPP (Biaxially Oriented Poly Propylene) film of 60 to 180 μm and Taber Stiffness greater than 5 units in the machine and cross direction for packaging soap bars. The film is said to be strong enough to dispense with the conventional stiffeners.

However, BOPP-BOPP laminates have poorer adaptability on packaging machines. Specifically, such films are prone to reverse-curling which tends to hinder their commercial use for packing soap or detergent bars by envelope wrapping. Also the laminate has a very small range at which it is easily amenable to sealing, which makes it necessary to have precise control on temperature of sealing bars so that there is no significant variation in temperature. A further limitation of such films is that as the two layers are made of the same material, any shrinkage of the first layer automatically leads to wrinkling of the other even at very low temperature as the softening point of BOPP is around 90 to 100° C.

U.S. Pat. No. 6,338,890 B1 (Teijin Limited, 2002) discloses a two-layer magnetic film made of biaxially oriented polyester. Each layer contains two different types of inert fine particles having different particle sizes and particular surface roughness properties. The film is meant for magnetic recording medium. While the film is primarily not meant for use as a packaging medium for soap and detergent products, even if one wants to use the disclosed film for packaging soap bars, the magnetic properties of the film would disallow such use because it is not capable of sealing without further treatment.

WO 0075035 A1 (Colgate-Palmolive) also discloses a transparent package for soap bars in which the bars are successively packed in a first and second transparent films. The first film is a transparent, thick and stiff film and the second film is thin and transparent. Disclosed benefits include lower fragrance and moisture loss. A drawback of the disclosed process is that it is a two-step process.

EP 0931646 A2 (Elopak Systems AG, 1999) discloses a 3-layer laminated film for packaging. The first and the third layer provide strength to the laminate whereas the intermediate layer serves as a tie-layer. The third layer has a specific surface coating. A wide range of materials of construction for each of the three layers has been disclosed.

US 2004238608 A1 (Colgate-Palmolive) discloses soap bars which are envelope wrapped in a two-ply film. The laminate has two films which are off-center juxtaposed to get a central two-ply structure leaving the two end regions as single ply films. Disclosed advantages are that the single film at the edges has better sealing properties. A wide range of materials of construction for each of the two layers has been disclosed. This includes combination of paper and plastic. The film disclosed in this application is very fragile especially towards the edges which may not allow steady movement on packaging machines. A further drawback of this two-ply film is that as there is significant difference in thickness of the edges and that in the centre of the film, it may lead to improper winding or tunneling effect thereby making it necessary to have tension-control means for winding the film properly.

A two-ply laminate has also been disclosed in ZA 200500240A (Unilever). The laminate contains two polyester films, each having a heat-sealable side and a non heat-sealable reverse side. The non heat-sealable side of one film is laminated to the corresponding non heat-sealable side of the other film. A drawback of the disclosed film is that it is highly prone to wrinkling and tends to provide imperfect and excessive unwanted folding which is likely to obliterate any artwork or product/regulatory information printed on the film. This problem cannot be avoided even by increasing the thickness of the film. Further, the disclosed film is also prone to curling but it tends to curl in a direction opposite to that which is otherwise intended in use. This is called reverse curling. Therefore using the film for envelope wrapping on a commercial scale presents technical and operational problems.

We have determined that at least some technical problems pertaining to adaptability on packaging machines can be overcome by introducing an intermediate layer having polyethylene between the two layers of polyester.

In a first aspect is disclosed a laminated film for packaging which includes:
(i) a first layer of polyester;
(ii) a second layer of polyester; and,
(iii) an intermediate layer having polyethylene therebetween
wherein thickness of the intermediate layer having polyethylene is less than thickness of either of the adjacent layers of polyester.

In a second aspect is disclosed a method of making a laminated film of the first aspect, having a step of laminating a first polyester film and a second polyester film simultaneously by extrusion lamination to either sides of polyethylene film.

In a third aspect is disclosed use of the laminated film of the first aspect for packaging a soap or a detergent bar.

In a fourth aspect is disclosed a packaged soap or detergent bar having:
(i) a soap or a detergent bar;
(ii) a stiffener overlaying a substantial part of the bar; and
(iii) a wrapper over the stiffener to wrap the bar from all sides,
wherein the wrapper is made of a laminated film having:
(a) a first layer of polyester;
(b) a second layer of polyester; and
(c) an intermediate layer having polyethylene therebetween wherein thickness of the intermediate layer having polyethylene is less than thickness of either of the adjacent layers of polyester.

Sustainable packaging formats are fast gaining wider popularity. Companies are increasingly keen on using sustainable packages for their products. On the other hand, consumers also prefer products which are packed in sustainable and environment friendly packages.

While packaging in general presents a wider area for innovative sustainable formats, packages meant for soap and detergent bars, better known as wrappers, present limited opportunity for innovation.

The reasons, as explained earlier, is high commodity costs and lower profit margins. At the same time, innovation cannot be sustained at the cost of product performance.

Accordingly, some of the known packaging formats which have already been described at length could not be implemented on commercial scale because several challenges need to be overcome at the factory scale for a lab-scale innovation to be commercially implemented. Soap bars are typically packaged at the speed of 160 to 180 bars per minute. Therefore, proper adaptability on packaging machines assumes utmost importance otherwise the speed of packaging can be adversely affected. Some of the important features that determine adaptability on machines include folding characteristics of the film, stiffness of the film and the ability to form crease-free folds.

At least some of these technical problems can be solved by the laminated film which is hereinafter disclosed in detail.

The laminated film for packaging includes:
(i) a first layer of polyester;
(ii) a second layer of polyester; and,
(iii) an intermediate layer having polyethylene therebetween wherein thickness of the intermediate layer having polyethylene is less than thickness of either of the adjacent layers of polyester.

THE FIRST AND SECOND LAYERS OF POLYESTER

The laminated film for packaging includes a first layer of polyester having laminated thereto, a second layer of polyester.

The term "layer" has been used in relation to the finished product, i.e. the laminated film because in the laminated film the individual components exist as layers. On the other hand, in the description pertaining to method for making the laminated film, the equivalent term "film" has been used because in a process, films are used and not layers. The films used to make the laminate eventually form layers of the laminated film.

Preferably each of the first and second layers of polyester is of heat-sealable or non heat-sealable grade.

The terms non heat-sealable and heat sealable polyester are widely known to person skilled in the art of packaging. As the name suggests, heat-sealable films are the ones in which the opposed heat-sealable surfaces thereof can be used for packaging by the application of heat alone in the so-called A to B seals or lap seals. ZA 200500240A (Unilever) discloses such a film.

It is preferred that each of the first and second layers of polyester is of non heat-sealable grade. Laminated films made of heat-sealable grade of polyester become tacky and tend to stick to themselves.

The laminated film is generally stored in a rolled-up form. Problems may become particularly acute when such films need to be unrolled for use.

Therefore, it is particularly preferred that the first and second layer are both, made of non heat-sealable grade of polyester. As heat-sealable polyester can be sealed by application of heat, laminated film in which the first layer is of heat-sealable polyester will not need any further treatment, such as the application of heat-sealing lacquer. However, in the case of laminated films in which the first layer of polyester is of non heat-sealable grade, such a layer would preferably need a coating of a heat-sealing lacquer which is preferably registered with any printing thereon.

Particularly preferred polyester is polyethyleneterepthalate (PET).

Each layer of polyester is individually either transparent or translucent or opaque and can have a suitable colour if needed.

It is preferred that surface energy of each of the layer of polyester is at least 40 dyne/cm. Surface energy is important in cases where the layer of polyester is printed or has a metallised effect.

Films or laminates are usually printed to enhance the aesthetic appeal. Printing can be classified under several heads but one of the most routinely used classifications is surface printing and reverse-printing. It is particularly preferred that the first layer is of reverse-printed polyester. The nature of information which is printed can vary depending on its purpose. This could range from artwork to any other form of decoration, a logo, trademark or a hologram. It could also be some information pertaining to the product or regulatory information.

Some blank areas may be left on the reverse-printed surface to achieve a see-through effect or to make more effective use of the second layer of polyester especially when this second layer has a metallised effect.

It is preferred that thickness of each layer of polyester is 8 µm to 25 µm. It is further preferred that thickness of each layer of polyester is 10 µm to 25 µm and more preferably 10 µm to 16 µm. The most preferred range is 10 µm to 14 µm. While it is technically possible to make a laminated film having differential thickness of the two polyester layers, it is preferred that the two layers of polyester have substantially the same thickness. Without wishing to be bound by theory it is believed that when the thickness is substantially the same, the resultant laminate shows lesser degree of reverse-curling as it is believed that the film is then appropriately balanced. The significantly lower thickness of polyester layers explains why the laminated film is considered sustainable because it requires significantly less material.

The second layer of polyester can suitably be nonmetallised. Alternatively, and more preferably, the second layer is of metallised polyester. Methods for producing a metallised effect are well known. Metallization creates a thin surface coating of a metal on the film. When metallised, it is preferred that thickness of the metalized coating is 1.5 to 2 Ohms per square. It is preferred that metalized effect is created by aluminium.

Certain technical effects were observed in the case of laminated films in which the second layer is of metallised polyester. Such laminated films were found to be stiffer than the corresponding films in which the second layer was non-metallised.

A further and more surprising technical effect was also observed. Almost all packaged goods generally bear at least a date and place of manufacture and a batch number. Earlier, inkjet printers were used for this purpose. However, a drawback of inject printing is that the printed matter is highly prone to smudging and scuffing. Therefore, inkjet printers were gradually replaced by laser machines for Online Laser Coding. Usually in order to use Online Laser Coding system, it is necessary to use very thick films as otherwise the laser drills holes in the film. Therefore laser machines are generally used in the case of films which, on an average, are about 100 µm to 150 µm thick. The thickness is necessary to withstand the amplified light.

It is preferred that (total) thickness of the laminated film is at least 28 µm.

It was observed that a laminated film having total thickness as low as 35 µm was perfectly amenable to Online Laser Coding. On the other hand, an obvious solution would have been to increase the thickness of the laminate by way of a very thick intermediate layer of polyethylene or by increasing the film thickness of the component polyester layers, which cannot be considered sustainable and environment friendly options.

The Intermediate Layer

The disclosed laminate film has an intermediate layer which includes polyethylene. This intermediate layer is between the first and the second layers of polyester.

The intermediate layer provides bonding and softening to the laminated film. It is generally observed that a polyester film cracks when folded. This feature presents some technical problems while using such films for packaging, especially for packaging soap bars on a commercial scale. Absence of the intermediate layer would leave the skilled person with limited options e.g. to increase the thickness of the parent polyester film.

However, as explained earlier, any increase in film thickness would not render the parent film amenable for use on high speed packaging machines because the film will very easily fold, crumple or reverse curl. Further, any indiscriminate increase in the content polyester would further adversely affect sustainability factor of the packaging film.

Laminated films having the components of polyester and polyethylene layers, better known as PET/POLY laminates, are still widely used by the soap and detergent industry. However, in such films, the content of polyethylene is disproportionately higher. Further, in such cases, the polyethylene layer is not concealed or sandwiched between two polyester layers as it is only a 2-layer structure as against the 3-layer structure which is now being disclosed. It is primarily used for the purpose of creating a fin seal (also called A to A seal) in which the polyethylene layer is sealed to itself.

In preferred laminated films the thickness of the intermediate layer having polyethylene is 9 µm to 20 µm. A preferred polyethylene is low density polyethylene. Other known forms of polyethylene such as high density polyethylene and medium density polyethylene are not preferred because such polymers provide stiffness which is not preferred, particularly for wrapping soap bars by envelope wrapping. It is preferred that the intermediate layer includes a modifier which is a polymer having ethylene and (meth) acrylic acid. This is an ethylene acid copolymer resin. A typical preferred material is Nucrel® resins from DuPont which are tough and light-weight ethylene copolymers. Preferably the intermediate layer is made of an extruded film which includes 10 to 30% modifier which is a polymer having ethylene and (meth)acrylic acid, the balance being polyethylene.

Film Properties

An unbalanced amount of polyester and polyethylene components could lead to a laminated film which although is properly bonded and soft but sill may not be fit for use on wrapping machines. In particular, while packing individual soap bars in envelope wrapped format, pieces of laminate having pre-defined dimensions are cut from a parent roll or stock. Such cut pieces must remain flat and in uncurled state for proper packaging. It is observed that some films, particularly after being cut to size, are not easily amenable for envelope wrapping. This happens when the films exhibit reverse-curling. In such a case, the relevant machine parts are not able to fold the wrapper as it either tends to curl or fold in a direction opposite to that of the intended direction, or is already folded or curled in the opposite direction. This results in a significant quantity of rejected packaging material.

It is believed that ratio of thickness of the individual polyester layers and the intermediate layer having polyethylene is important. Without wishing to be bound by theory it is believed that when thickness of the polyethylene layer is greater than any one of the individual polyester layers, the resultant laminated film tends to show reverse curling. Therefore, it is preferred that thickness of the intermediate layer having polyethylene is less than thickness of either of the adjacent layers of polyester.

It is particularly preferred that the intermediate layer is white in colour. This can be made by blending a suitable master batch during the processing stage. A white coloured intermediate layer provides opacity.

Alternatively, and more preferably, the intermediate layer is transparent. This provides enhanced gloss to the laminated film. Such a transparent intermediate layer is especially useful when the second layer of polyester is metallised.

A further advantage of transparent layer over its coloured counterpart is that as this layer is preferably very thin, a higher amount of master batch needs to be blended in for desired level of opacity. Higher amount of master batch means higher raw material costs which can be avoided in the case of transparent intermediate film.

Method of Making the Laminated Film

In accordance with a second aspect is disclosed a method for making a laminated film of the first aspect including a step of laminating a first polyester film and a second polyester film simultaneously by extrusion lamination to either sides of polyethylene film.

The process of extrusion lamination is well known to persons skilled in the art of packaging. In summary, in an extrusion lamination process (T-die extrusion process) involves extruding a resin from a T-die at temperatures in the range of 180 to 220° C. directly onto a moving web which is then passed through a nip consisting of a rubber-covered pressure roller and a chrome plated cooling roll. The latter cools the molten film back into the solid state and also imparts a desired finish to the plastic surface.

As the film is extruded from T-die in hot state, the first and the second polyester films (which are unwound from respective rollers) are brought in contact with either sides of the extruded film while it is still in hot and molten state. The heat and pressure causes the two polyester films to continuously laminate to either sides of the hot extruded film having polyethylene as it gets extruded. The extruded hot molten resin itself acts as a bonding medium to the first and second films of polyester.

Details of the first and second polyester films and that of the third film having polyethylene have already been explained in the description pertaining to the first aspect of this invention.

In a third aspect is disclosed use of a laminated film of the first aspect for packaging soap or detergent bars. Preferably, the disclosed laminate is used for packing soap or detergent bars by envelope wrapping method. Necessary details of envelope wrapping method are known to persons skilled in the art.

In accordance with a fourth aspect is disclosed a packaged soap or detergent bar having:
(i) a soap or a detergent bar;
(ii) a stiffener overlaying a substantial part of the bar; and
(iii) a wrapper over the stiffener to wrap the bar from all sides,
wherein the wrapper is made of a laminated film having:
(a) a first layer of polyester;
(b) a second layer of polyester; and
(c) an intermediate layer having polyethylene therebetween wherein thickness of the intermediate layer having polyethylene is less than thickness of either of the adjacent layers of polyester.

In summary, this aspect of the invention covers a packaged soap or detergent bar which is wrapped in a laminated film of the first aspect.

The package contains a bar of soap and packaging material and preferably a stiffener for added strength. Methods for making such packages are well-known.

The stiffener can be made of paper, plastic or a combination thereof. Details of such stiffeners can be found in e.g. WO 2008148611 A1 (Unilever) and U.S. Pat. No. 6,242,397 B1 (Unilever)

Soap bars meant for personal wash are found in various shapes. Saddle shaped bars are quite common. These bars have a flatter top and a slightly concave depressed bottom surface opposite to the top surface. Usually soap bars are envelope wrapped in such a way that the lap seal is positioned at the bottom surface. When such bars are saddle shaped, the opposed edges of the wrapper may not seal properly. This technical problem can be solved by using stiffeners of higher grammage in the disclosed packaged soap or detergent bar. Therefore, it is preferred that grammage of the stiffener is 140 to 190 g/m². It is particularly preferred that grammage of stiffener is 180 to 190 g/m². This will effectively lead to the seal plate or band holding the overlapping film edges against the planar area of the bottom surface of the soap bar to effect the bottom seal of the soap bar package.

It will be appreciated how the disclosed laminated film provides a technical solution to at least some problems faced by known films and laminates, particularly pertaining to sustainability and adaptability on packaging machines.

It should be understood that the specific forms of the invention herein illustrated and described are intended to be representative only as certain changes may be made therein without departing from the clear teachings of the disclosure.

Although the invention has been described with reference to specific embodiments, it will be appreciated by those skilled in the art that the invention may be embodied in many other forms.

The invention claimed is:

1. A laminated film for packaging, consisting of:
(i) a first layer of non-metallized polyester;
(ii) a second layer of metallized polyester; and,
(iii) an intermediate layer comprising polyethylene between the first layer of non-metallized polyester and the second layer of metallized polyester;
wherein a thickness of the intermediate layer is less than a thickness of either of the first layer of non-metallized polyester and the second layer of metallized polyester.

2. The laminated film as claimed in claim 1, wherein the first and second layers of polyester are heat-sealable grade.

3. The laminated film as claimed in claim 1, wherein the surface energy of each of the first and second layers of polyester is at least 40 dyne/cm.

4. The laminated film as claimed in claim 1, wherein the thickness of the film is at least 28 μm.

5. The laminated film as claimed in claim 1, wherein the thickness of each of the first and second layers of polyester is 10 μm to 25 μm.

6. The laminated film as claimed in claim 1, wherein said first layer is of reverse-printed polyester.

7. The laminated film as claimed in claim 1, wherein said polyethylene is low density polyethylene.

8. The laminated film as claimed in claim 1, wherein the thickness of said intermediate layer is 9 μm to 20 μm.

9. The laminated film as claimed in claim 1, wherein said intermediate layer comprises a modifier which is a polymer comprising ethylene and (meth)acrylic acid.

10. A method of making a laminated film as claimed in claim 1, comprising a step of laminating a side of a first polyester film and a side of a second polyester film simultaneously by extrusion lamination to both sides of a polyethylene film.

11. A method of wrapping the laminated film as claimed in claim 1 for packaging a soap or a detergent bar.

12. A packaged soap or detergent bar comprising:
(i) a soap or detergent bar;
(ii) a stiffener overlaying a substantial part of the bar; and
(iii) a wrapper over said stiffener to wrap said bar from all sides,
wherein said wrapper is made of a laminated film consisting of:
(a) a first layer of polyester;
(b) a second layer of metallized polyester; and
(c) an intermediate layer comprising polyethylene between the first and second layers;
wherein a thickness of the intermediate layer is less than a thickness of either of the first layer and the second layer.

13. The laminated film as claimed in claim 1, wherein a thickness of a metallized coating of the second layer of metallized polyester is 1.5-2 Ohms per square.

* * * * *